United States Patent [19]

Kydonieus

[11] 4,193,984
[45] Mar. 18, 1980

[54] METHOD AND COMPOSITIONS FOR CONTROLLING FLYING INSECTS

[75] Inventor: Agis F. Kydonieus, New York, N.Y.

[73] Assignee: Herculite Protective Fabrics Corporation, New York, N.Y.

[21] Appl. No.: 780,398

[22] Filed: Mar. 23, 1977

Related U.S. Application Data

[63] Continuation-in-part of Ser. No. 675,424, Apr. 9, 1976, abandoned.

[51] Int. Cl.² .......................... A61L 3/00; A61L 9/04; B32B 27/08; B32B 27/18
[52] U.S. Cl. ........................................ 424/16; 43/124; 43/131; 424/14; 424/17; 424/84
[58] Field of Search ..................... 43/124, 131; 424/14, 424/16, 17, 84

[56] References Cited

U.S. PATENT DOCUMENTS

| | | | |
|---|---|---|---|
| 2,808,679 | 10/1957 | Collins | 43/131 |
| 2,899,771 | 8/1959 | Burris | 43/124 |
| 2,911,756 | 11/1959 | Geary | 43/114 |
| 3,295,246 | 1/1967 | Landsman et al. | 43/131 |
| 3,324,590 | 6/1967 | Richardson | 43/131 |
| 3,685,734 | 8/1972 | Paciorek et al. | 239/56 |
| 3,702,358 | 11/1972 | Green et al. | 424/84 |
| 3,755,563 | 8/1973 | Vite | 424/84 |
| 3,798,318 | 3/1974 | Wright | 424/84 |
| 3,864,468 | 2/1975 | Hyman et al. | 424/16 |
| 3,866,349 | 2/1975 | Meijer et al. | 43/114 |

FOREIGN PATENT DOCUMENTS

| | | |
|---|---|---|
| 659040 | 7/1965 | Belgium . |
| 820284 | 10/1974 | Belgium . |
| 1436075 | 5/1976 | United Kingdom . |

OTHER PUBLICATIONS

U.S.P.T.O. Translation 4/14/78 of Nakayama, H., "Synergistic Action of Safrol Derivatives with Pyrethrins on Knocking Off and Killing Houseflies", Botyu-Kagaku 15 223-230 1950).
USPTO Translation 4/13/78 of Kamorzina et al., "Results of Experiments with Scented Substances as Odorants for Insecitides and Repellents", Khimiya v Selskom Khozyayste 4(7): 499-501 (1966).
Ubik et al., Naturwissenschaften 62: 348(1975), "Vanillin: Possible Sex Pheromone of an Insect".
Beroza, Morton et al., (1974), Environ. Entomol, 3:926-928, "Tests of a 3-Layer Laminated Plastic Bait Dispenser for Controlled Emission of Attractants from Insect Traps".
Beroza, Morton, E. C. Paszek, D. De Vilbiss and B. A. Bierl, (1975), Environ. Entomol. (in press), "Field and Laboratory Data on Hercon 3-Layer Laminated Plastic Dispensers of Disparlure for Gypsy Moth Traps".
Hyman, S., Catalysts for Environmental Quality 4(4): 20, 24-25, "Gypsy Moths Face Sex Weapon".
ACS Symposium Series, No. 33: 295-302, Apr. 5-9 (1976), "Controlled Release Polymeric Formulations-Application of a New Controlled Release Concept in Household Products", A. F. Kydonieus, A. R. Quisumbing, S. Hyman.
C.A. 45 #8702(h) (1951), 63 #18967(a) (1965), 63 #779e (1965), 65 #2944d (1966), 67 #61937r (1967).
C.A. 77 #71448c (1972), 83 #94034c (1975), 85 #172812n (1976).
C.A. 77 #71409r, 84450x, 97709a (1972), 79 #28330n, 74855k (1973), 80 #11181n, #79110u (1974), 81 #73341u (1974).
C.A. 82 #12200w, #39522q (1975), 83 #23399q, #54508d (1975), 84 #39663c, #146087q (1976), 85 #172718m (1976).
C.A. 82 #27247r (1975), #107559j (1975).
C.A. 72 #133746f (1970), 74 #112843m (1971).

*Primary Examiner*—Shep K. Rose
*Attorney, Agent, or Firm*—Sughrue, Rothwell, Mion, Zinn and Macpeak

[57] ABSTRACT

The invention concerns solid, polymeric dispensers for insecticides effective in controlling flying insects, especially flies, and to methods for using such strips in controlling such insects.

12 Claims, No Drawings

METHOD AND COMPOSITIONS FOR CONTROLLING FLYING INSECTS

This application is a continuation-in-part of application Ser. No. 675,424, filed Apr. 9, 1976, now abandoned.

BACKGROUND OF THE INVENTION

The invention relates to flying insect control and compositions and methods for accomplishing such control.

In the past, deployment of a variety of strip-like materials has been employed in an effort to control flying insects. So-called "fly paper" was widely used in the United States a generation ago and this approach depended upon trapping the insect on an adhesive surface. The technique was unsightly and of limited effectiveness. Polymeric controlled release dispensers have been employed to provide a fumigant effect. The Shell Fly-Strip is a strip of polyvinyl chloride impregnated with DDVP which is released into the atmosphere in concentrations toxic to flies. In poorly ventilated rooms, the concentration of volatilized DDVP is noticeable and objectionable to many persons. In well-ventilated spaces, the concentration frequently is unable to reach a toxic level.

Examples of prior art insecticidal devices are those mentioned in U.S. Pat. Nos. 2,911,756; 2,899,771; 2,808,679; 3,295,246; 3,798,318 and 3,324,590.

Applicant has discovered a uniquely effective dispenser for controlling flying insects without the disadvantages of the prior art devices.

SUMMARY OF THE INVENTION

According to the invention, flies and other flying insects are controlled by deploying strips of polymeric controlled release material containing resmethrin in association with vanillin.

DETAILED DESCRIPTION OF THE INVENTION

It has been found that the use of resmethrin, i.e., (5-benzyl-3-furyl) methyl 2,2-dimethyl-3-(2-methylpropenyl) cyclopropane carboxylate, as a non-volatile insecticide with vanillin, i.e., 3-methoxy-4-hydroxybenzaldehyde, as a volatile attractant provides a uniquely effective system for control of flying insects, especially flies.

The active agents resmethrin and vanillin can be used in a solid controlled release polymeric dispenser such as a homogeneous polymeric matrix material, such as a sheeting, or a multilayer dispenser of the type described in U.S. Pat. No. 3,864,468 which is assigned to the assignee of the present invention.

The multilayer dispenser may be a sheeting containing the active agents in one or more internal layers protected from atmospheric degradation by outer layers adhered thereto, at least one of which is a solid polymeric layer through which the active agents can migrate to become available at the outer surface thereof. Further, the dispenser can comprise three layers to form a laminate sheet, the outer layers being solid polymeric layers, preferably polyvinyl chloride, and the internal layer being a storage layer, preferably a polyvinyl chloride plastisol, for the active agents which then migrate through the outer layers to become available at the surfaces of the sheet. The concentration of agents in the middle layer, thickness of the outer layers, as well as the presence of other barrier layers, serve to adjust the available amounts of agents to effective but not superfluous levels.

Preferably, the dispenser is a multilayer sheeting wherein separate storage and migration systems for the two agents are used but the systems are in close proximity to each other. Preferably, this is done by providing the resmethrin in a first sheeting section in an internal storage layer, preferably polyvinyl plastisol, and adhered on both sides thereof solid polymeric sheeting layers, preferably polyvinyl chloride, through which the resmethrin can migrate to become available at the outer surfaces. The vanillin is provided in a second sheeting section in a similar internal layer with similar outer layers or with one permeable and one impermeable to migration outer layers. The two sections are used in close proximity so that insects attracted by the second section will touch the first. This can be done by adhesively applying a strip of the second section to one or both surfaces of the first, wherein the second section is smaller in area than the first section. If the second section has one permeable and impermeable layer, the impermeable barrier layer is affixed toward the first section.

EXAMPLES

A resmethrin dispenser was prepared by mixing the following to obtain a plastisol:

|  | By weight |
| --- | --- |
| SBP-1382 ® (a registered trademark of S. B. Penick & Co.) (resmethrin) | 33% |
| Polyvinyl chloride resin binder (PVC #6338 from Firestone) | 42% |
| Di(2-ethylhexyl) phthalate plasticizer (DOP from Van Horn & Metz) | 24% |
| Barium-cadmium-zinc phosphate stabilizer (V-1515 from Tenneco) | 1% |

The plastisol is placed between two sheets of polyvinyl chloride film 2 mils thick and pressed to give a laminate of about 6 mils thick.

A vanillin dispenser was prepared by mixing the following to obtain a plastisol:

|  | By weight |
| --- | --- |
| Vanillin, USP | 21% |
| PVC #6338 (as above) | 51% |
| DOP (as above) | 27% |
| V-1515 (as above) | 1% |

The vanillin plastisol is placed between a sheet of Mylar 2 mils thick as an impermeable barrier and a sheet of polyvinyl chloride 5 mils thick and pressed to give a laminate 12 mils (0.012 inches) thick.

A strip of the vanillin laminate about ½ inch by 8 inches is then affixed by a pressure-sensitive adhesive to a 4 inch by 6 inch sheet of resmethrin laminate with the impermeable Mylar toward the adhesive. The dispenser obtained is thus a 4 inch by 6 inch sheet with a band of vanillin dispenser running about the width about half way between the two lengthwise ends.

Dispensers made as above with varying concentrations, per weight of the dispenser, of resmethrin and vanillin were prepared and tested as summarized below.

The bait in Strip 1 was applied as a solution to the strip and dried.

TABLE I

| Strip No. | Insecticide (SBP-1382) (% w/w) | Attractant I (% w/w) (Vanillin) | Food (% w/w) (Starch-Sugar) |
|---|---|---|---|
| 1 | 11.95 | — | 10.0 |
| 2 | 7.71 | — | — |
| 3 | 8.59 | 12.30 | — |
| 4 | 11.46 | 8.36 | — |

Results of Fly Strip Tests Using CSMA F58 WT Flies (Room Volume 1009 cu. ft.)

| Strip No. | No. of Fies | Percent Knockdown | | | | | | | % Down or Dead | |
|---|---|---|---|---|---|---|---|---|---|---|
| | | 1 hr | 2 hrs | 3 hrs | 4 hrs | 5 hrs | 6 hrs | 7 hrs | 24 hrs | 48 hrs |
| 1 | 108 | 14.8 | 26.9 | 28.7 | 38.9 | 50.0 | 51.9 | 55.6 | 46.3 | 90.7 |
| | 87 | 1.1 | 2.3 | 11.5 | 13.8 | 21.8 | 39.1 | — | 51.7 | 62.1 |
| | 126 | 25.4 | 31.7 | 34.9 | 38.9 | 42.9 | 38.1 | 41.3 | 46.0 | 57.1 |
| Average | 107 | 13.7 | 20.3 | 25.0 | 30.5 | 38.2 | 43.0 | 48.4 | 48.0 | 69.9 |
| 2 | 215 | 9.3 | 15.8 | 25.6 | 26.5 | 35.3 | 38.1 | 46.5 | 81.9 | 88.4 |
| | 59 | 8.5 | 8.5 | 8.5 | 16.9 | 22.0 | 16.9 | — | 61.0 | 76.3 |
| | 226 | 4.0 | 7.1 | 7.5 | 5.8 | 5.8 | 7.5 | 7.5 | 36.3 | 52.7 |
| Average | 166 | 7.2 | 10.4 | 13.8 | 16.4 | 21.0 | 20.8 | 27.0 | 59.7 | 72.4 |
| 3 | 75 | 22.7 | 22.7 | 50.7 | 50.7 | 61.3 | 65.3 | 96.0 | 74.7 | 89.3 |
| | 27 | 22.2 | 18.5 | 37.0 | 37.0 | 70.4 | 66.7 | — | 85.2 | 74.1 |
| | 289 | 6.6 | 8.3 | 9.7 | 8.3 | 11.1 | 15.6 | 17.0 | 35.6 | 62.3 |
| Average | 130 | 17.1 | 16.5 | 32.4 | 32.0 | 47.6 | 49.2 | 56.5 | 65.1 | 75.2 |
| 4 | 166 | 6.9 | 42.2 | 42.2 | 57.8 | 62.7 | 69.9 | 77.7 | 93.3 | 98.2 |
| | 145 | 3.4 | 4.8 | 7.6 | 9.7 | 12.4 | 22.1 | 26.2 | 46.9 | 73.1 |
| | 258 | 17.8 | 20.9 | 22.9 | 25.2 | 26.4 | 27.5 | 25.6 | 41.9 | 63.2 |
| Average | 189 | 12.7 | 22.6 | 24.2 | 30.9 | 33.8 | 39.8 | 43.1 | 60.7 | 78.1 |

It should be noted that resmethrin can be used in amounts from about 5 to 15% by weight of the dispenser.

In Table II below, the results of aging tests are shown. These show that both the insecticide and attractant components are stable and will continuously kill flies even if they are over 6 months old.

TABLE II

Aging Tests Results in a 1000 cu.ft. Room Using CSMA F 58 WT Flies. Dispenser Contains 11.75% SBP-1382 PG-XY and 5.29% Vanillin Attractant

| Age of Strip (Months) | Percent Dead and Down | | | | Remarks |
|---|---|---|---|---|---|
| | 24 hrs. | 48 hrs. | 72 hrs. | 96 hrs. | |
| 0.75 | 64.0 | 95.3 | Not taken | | Continuously stored in aluminum foil except for 48 hrs. testing periods. |
| 1.25 | 60.5 | 94.5 | Not taken | | |
| 7.5 | 52.8 | 80.3 | Not taken | | Left hanging uncovered in room immediately after this test. |
| 8.0 | Not taken | | 65.6 | 82.8 | Continuously exposed and hanging in room. |
| 8.25 | 53.7 | Not taken | | 77.8 | Continuously exposed and hanging in room |

What is claimed is:

1. A dispenser for controlling flies comprising
a first section of sheeting comprising an internal layer containing resmethrin as a non-volatile insecticide for said flies and adhered to both sides of the internal layer, solid polymeric layers through which said resmethrin is capable of migrating to become available on outer surfaces of said first section of sheeting; and
a second section of sheeting, having a smaller surface area than the first section, comprising an internal layer containing vanillin as a volatile fly attractant and adhered to both sides of the internal layer, solid polymeric layers at least through one of which said vanillin is capable of migrating to become available on at least one outer surface of said second section of sheeting,
wherein said first and second sections are in contact with each other to form a single unit.

2. The dispenser of claim 1, wherein said solid polymeric layers of the first section are layers of polyvinyl chloride.

3. The dispenser of claim 2, wherein a solid polymeric layer of the second sheeting is polyvinyl chloride and the other solid polymeric layer is a barrier to the migration of vanillin and wherein the exposed surface of the barrier layer of the second section of sheeting is adhesively adhered to the first section of sheeting.

4. The dispenser of claim 1, wherein the resmethrin is present in said first section of sheeting in an amount of from about 5 to 15% by weight of the first section of sheeting.

5. The dispenser of claim 1, wherein the internal layer of the first section of sheeting and the internal layer of the second section of sheeting are polyvinyl chloride plastisols.

6. The dispenser of claim 1, wherein said resmethrin and vanillin are present in said internal layers in an amount sufficient to provide insecticidal and effective fly attractant amounts, respectively, on the exposed surfaces of said dispenser.

7. A method for controlling flies comprising deploying in a space infested or liable to be infested by flies a dispenser comprising a first section of sheeting comprising an internal layer containing resmethrin as a non-volatile insecticide for said flies and adhered to both sides of the internal layer, solid polymeric layers through which said resmethrin is capable of migrating to become available on outer surfaces of said first section of sheeting; and a second section of sheeting, having a smaller surface area than the first section, comprising an internal layer containing vanillin as a volatile fly attractant and adhered to both sides of the internal layer, solid polymeric layers at least through one of which said vanillin is capable of migrating to become available on at least one outer surface of said second section of sheeting, wherein said first and second sections are in contact with each other to form a single unit.

8. The method of claim 7, wherein said solid polymeric layers of the first section are layers of polyvinyl chloride.

9. The method of claim 8, wherein a solid polymeric layer of the second sheeting is polyvinyl chloride and the other solid polymeric layer is a barrier to the migration of vanillin and wherein the exposed surface of the barrier layer of the second section of sheeting is adhesively adhered to the first section of sheeting.

10. The method of claim 7, wherein the resmethrin is present in said first section of sheeting in an amount of from about 5 to 15% by weight of the first section of sheeting.

11. The method of claim 7, wherein the internal layer of the first section of sheeting and the internal layer of the second section of sheeting are polyvinyl chloride plastisols.

12. The method of claim 7, wherein said resmethrin and vanillin are present in said internal layers in an amount sufficient to provide insecticidal and effective fly attractant amounts, respectively, on the exposed surfaces of said dispenser.

* * * * *